United States Patent
Zhang et al.

(10) Patent No.: US 10,302,698 B1
(45) Date of Patent: May 28, 2019

(54) ESTIMATION OF POWER CONSUMED BY COMBINATORIAL CIRCUITRY

(71) Applicant: Xilinx, Inc., San Jose, CA (US)

(72) Inventors: Fan Zhang, San Jose, CA (US); Anup K. Sultania, Santa Clara, CA (US)

(73) Assignee: XILINX, INC., San Jose, CA (US)

( * ) Notice: Subject to any disclaimer, the term of this patent is extended or adjusted under 35 U.S.C. 154(b) by 1 day.

(21) Appl. No.: 15/589,648

(22) Filed: May 8, 2017

(51) Int. Cl.
  *G01R 31/00* (2006.01)
  *G01R 31/3177* (2006.01)
  *G01R 31/317* (2006.01)

(52) U.S. Cl.
  CPC ... *G01R 31/3177* (2013.01); *G01R 31/31721* (2013.01); *G01R 31/31723* (2013.01)

(58) Field of Classification Search
  CPC .......... G01R 31/3177; G01R 31/31721; G01R 31/31723
  See application file for complete search history.

(56) References Cited

U.S. PATENT DOCUMENTS

| | | | | |
|---|---|---|---|---|
| 6,823,017 B1* | 11/2004 | Davis | ................... | H04B 14/046 375/242 |
| 7,483,328 B2* | 1/2009 | Kim | ................... | G11C 7/02 365/189.07 |
| 7,801,409 B2* | 9/2010 | Howell | ................ | G11B 27/038 386/353 |
| 8,146,035 B1 | 3/2012 | Schumacher et al. | | |
| 8,433,543 B2* | 4/2013 | LeBrun | .............. | G01R 13/0263 701/79 |
| 9,143,876 B2* | 9/2015 | Kropfitsch | ........... | H04R 19/005 |
| 9,541,603 B2* | 1/2017 | Park | .................. | G01R 31/31816 |
| 9,673,819 B2* | 6/2017 | Sehgal | ............. | H03K 19/01750 |
| 9,741,450 B2* | 8/2017 | Bouzekri Alami | .... | G11C 29/50 |
| 9,792,394 B2* | 10/2017 | De | ....................... | G06F 17/5045 |

OTHER PUBLICATIONS

Czajkowski, Tomasz S., "Fast Toggle Rate Computation for FPGA Circuits," 2008 International Conference on Field Programmable Logic and Applications, Sep. 8, 2008, pp. 65-70, IEEE, Piscataway, New Jersey, USA.

Monteiro, Jose, "Estimation of Average Switching Activity in Combinational Logic Circuits Using Symbolic Simulation," IEEE Transactions on Computer-Aided Design of Integrated Circuits and Systems, Jan. 1997, pp. 121-127, vol. 16, No. 1, IEEE, Piscataway, New Jersey, USA.

* cited by examiner

*Primary Examiner* — Esaw T Abraham

(74) *Attorney, Agent, or Firm* — LeRoy D. Maunu

(57) ABSTRACT

Disclosed approaches of determining an estimated glitch toggle rate at an output of a logic circuit include inputting functional static probabilities of combinations of states of the plurality of inputs and a generated glitch toggle rate of the logic circuit. Each functional static probability indicates a probability of the states of the inputs of the combination. For each input of the plurality of inputs to the logic circuit, a Boolean Difference Function (BDF) of the input is generated. A maximum glitch rate, which is the estimated glitch toggle rate, is determined based on the generated glitch toggle rate and the functional static probabilities associated with selected combinations of states of the BDF.

20 Claims, 5 Drawing Sheets

ESTIMATION OF POWER CONSUMED BY COMBINATORIAL CIRCUITRY

TECHNICAL FIELD

The disclosure generally relates to estimating power consumed by combinatorial circuitry.

BACKGROUND

Programmable logic devices (PLDs) are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Accurately assessing the power consumption of an electronic circuit is increasingly important with the proliferation of battery powered devices. However, some approaches may significantly underestimate or overestimate the power needs of a device. Approaches for estimating the power consumption that are not based on simulation of the circuit design rely on probabilistic measures for the inputs and the switching activities ("toggle rates"). The toggle rate is the rate at which a net or logic element changes state compared to its input(s). For synchronous elements, the toggle rate reflects how often an output changes relative to a given dock input.

Glitches could as much as double the toggle rate. A glitch is spurious transient output of a combinational circuit and can be caused by delays of internal signals in a combinational circuit such that the state of the output depends on the delays. As the input signals may not arrive at the same time for generating the output signal, the state of the output signal can toggle until the input signals are stabilized. Power consumption may be significantly underestimated or overestimated depending on how glitches are handled.

SUMMARY

A disclosed method of determining an estimated glitch toggle rate at an output of a logic circuit having a plurality of inputs includes inputting to a programmed computing arrangement, functional static probabilities of combinations of states of the plurality of inputs. Each functional static probability indicates a probability of the states of the inputs of the combination. A generated glitch toggle rate of the logic circuit is also input to the programmed computing arrangement. For each input of the plurality of inputs to the logic circuit, a Boolean Difference Function (BDF) of the input is generated. The programmed computing arrangement determines the estimated glitch toggle rate, which is a maximum glitch rate, based on the generated glitch toggle rate and the functional static probabilities associated with selected combinations of states of the BDF. The computing arrangement outputs data indicative of the estimated glitch toggle rate.

A disclosed method of estimating from a circuit design, a level of power consumption of a logic circuit implemented from the circuit design includes determining by a programmed computing arrangement, for the logic circuit having a plurality of inputs, an estimated glitch toggle rate at an output of the logic circuit. The determining the estimated glitch toggle rate includes inputting to the computing arrangement, functional static probabilities of combinations of states of the plurality of inputs. Each functional static probability indicates a probability of the states of the inputs of the combination. A generated glitch toggle rate of the logic circuit is also input to the programmed computing arrangement. The computing arrangement generates for each input of the plurality of inputs to the logic circuit, a Boolean Difference Function (BDF) of the input. The programmed computing arrangement determines the estimated glitch toggle rate, which is a maximum glitch rate, based on the generated glitch toggle rate and the functional static probabilities associated with selected combinations of states of the BDF. For the logic circuit, the programmed computing arrangement determines a total toggle rate based on the estimated glitch toggle rate, generated glitch toggle rate, and a functional toggle rate of the logic circuit. The level of power consumption is determined by the programmed computing arrangement based on a power supply voltage level to the logic circuit, a net capacitance of the logic circuit, and the total toggle rate. The computing arrangement outputs data indicative of the level of power consumption.

A disclosed system for determining an estimated glitch toggle rate at an output of a logic circuit having a plurality of inputs includes a processor arrangement and a memory coupled to the processor arrangement. The memory is configured with instructions that when executed by the processor arrangement cause the processor arrangement to perform operations including inputting functional static probabilities of combinations of states of the plurality of inputs. Each functional static probability indicates a probability of the states of the inputs of the combination. The processor arrangement inputs a generated glitch toggle rate of the logic circuit and generates for each input of the plurality of inputs to the logic circuit, a Boolean Difference Function (BDF) of the input. The estimated glitch toggle rate is determined by the processor arrangement to be a maximum glitch rate based on the generated glitch toggle rate and the functional static probabilities associated with selected combinations of states of the BDF. The processor arrangement outputs data indicative of the estimated glitch toggle rate.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

Figure 1:
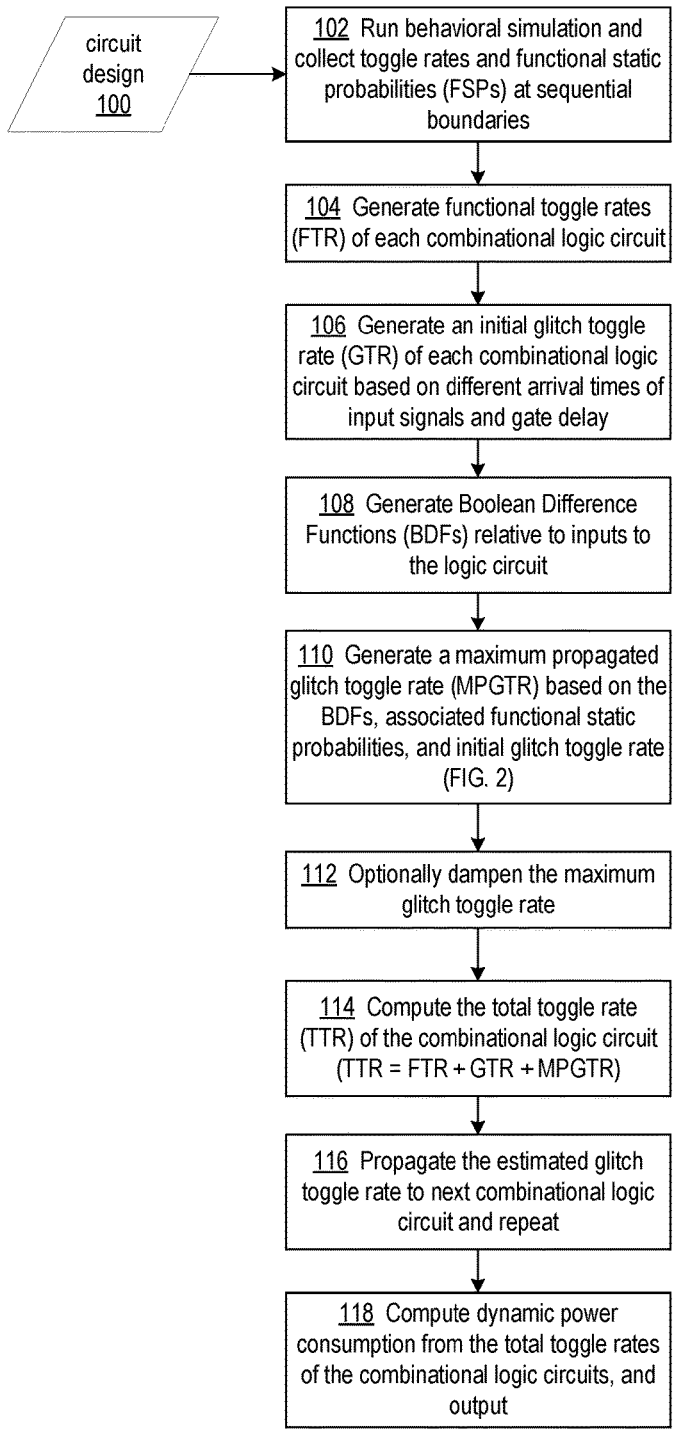
FIG. 1 is a flowchart of a process of determining an estimated glitch toggle rate and estimated power consumption of a combinational logic circuit.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

In many situations, performing post-routing timing simulation ("vectored flow") to generate glitch data for analyzing power consumption is not feasible due to time constraints. This may be especially prevalent for circuit designs directed to FPGA circuitry. Power consumption may be significantly underestimated without an accurate glitch estimation approach in a vector-less flow. Glitch can be affected by multiple factors, including but not limited to, design functional toggle patterns, wire/gate delays, and static probabilities on critically sensitive nodes. The disclosed approaches estimate a glitch toggle rate without requiring post-route simulation.

In estimating a glitch toggle rate for a combinational logic circuit, functional toggle rates and static probabilities are obtained from pre-routing behavioral simulation of the circuit design, and a generated glitch rate can be obtained from existing design tools. The generated glitch toggle rate and static probabilities are used to determine a maximum propagated glitch toggle rate of the combinational logic circuit. As an optional step, a glitch dampening model can be applied to the maximum propagated glitch toggle rate in order to reduce the maximum rate to a rate that more accurately reflects the context of the combinational logic circuit.

FIG. 1 is a flowchart of a process of determining an estimated glitch toggle rate and estimated power consumption of a combinational logic circuit in accordance with some implementations. Based on circuit design 100, at block 102 behavioral simulation executing on a computer system obtains toggle rates and functional static probabilities of all sequential elements in the circuit design. The toggle rate reflects how often an output changes relative to a given clock input. Each functional static probability indicates of a probability of the state of the input being logic 1 at any given time.

At block 104, the process propagates functional toggle rate and static probability to all combinational circuits from the toggle rate and static probability of sequential elements computed from block 102. Each combinational logic circuit can include one or more logic gates or look-up tables in an FPGA, has input signals provided by sequential circuits (e.g., latches or flop flops), and provides an output signal as input to a sequential circuit. The process generates an initial glitch toggle rate at block 106 based on the different arrival times of the input signals and delays of logic gates. The glitch toggle rate is the rate at which an output signal changes state as a result of different arrival times of the input signals and can be expressed as the number of transitions in the state of the output signal per clock cycle. Electronic Design Automation (EDA) tools such as the MODELSIM® simulator can be used to generate the information of block 102. Information of block 104 can be obtained from a vector-less functional propagation engine using an EDA tool such as the Vivado EDA from Xilinx. Information of block 106 can be generated by a generated-glitch estimation engine of the Vivado EDA.

Boolean Difference Functions (BDFs) are created at block 108. The BDF of an input to a logic circuit (e.g., a gate or a LUT) is the condition under which a toggle on the input will also lead to a toggle on the logic circuit output when the other inputs are held constant. The BDF is a logic expression. For example, for a 3-input LUT having inputs designated A1, A2, and A3, the BDF(A1)=f(0, A2, A3) XOR f(1, A2, A3), where the function "f" is the logic condition. Similarly, the BDF(A2)=g(A1, 0, A3) XOR g(A1, 1, A3), and BDF(A3)=h(A1, A2, 0) XOR h(A1, A2, 1). For a combinational logic circuit having multiple gates or LUTs, BDFs are generated for the inputs of each gate or LUT. A tool such as the CU Decision Diagram (CUDD) package can be executed to prepare the BDFs.

At block 110, the estimated glitch toggle rate is determined based on the BDFs, functional static probabilities, and generated glitch toggle rate. The estimated glitch toggle rate is computed based on the input factors to be a maximum propagated glitch toggle rate in order to avoid underestimating power consumption. Further description of the processing of block 110 is provided in the discussion of FIG. 2. The maximum propagated glitch toggle rate is output for use in calculating the power consumption of the logic circuit.

In order to more accurately estimate power consumption, the maximum propagated glitch toggle rate can be reduced by accounting for the particular context of the combinational logic circuit. At block 112, a dampening model is optionally applied to the maximum propagated glitch toggle rate. The dampening model is a factor that reduces the maximum propagated glitch toggle rate based on the number of gate levels in the combinational logic circuit, the difference in arrival times of the input signals, and gate delays. The model is based on data gathered from post-route timing simulation of other circuit designs on the same semiconductor technology and post-synthesis functional simulation data. Different models can be used for different semiconductor technologies. Generally, an increasing number of gate levels driving an output net filters out an increasing percentage of glitch that could propagate to the net, small differences in arrival times reduce glitch, and larger gate delays reduce propagated glitch. As propagated glitch is reduced, the propagated glitch toggle rate is also reduced.

At block 114, the total toggle rate of the combinational logic circuit is determined based on the functional toggle rate, the initial glitch toggle rate, and the maximum propagated glitch toggle rate. Note that the maximum propagated glitch toggle rate may have been reduced by the dampening factor in block 112. The total toggle rate is the sum of the functional toggle rate, initial glitch toggle rate, and the maximum propagated glitch toggle rate. The maximum propagated glitch toggle rate can be propagated to the next combinational logic circuit at block 116, and the processing of blocks 110-114 can be repeated for the next combinational logic circuit.

The dynamic power consumption is computed at block 118 using the total toggle rates of the combinational logic circuits. Having an accurate estimated glitch toggle rate contributes to an accurate estimation of dynamic power consumption. As recognized by those skilled in the art, the average dynamic power consumption of a combinational logic circuit can be computed as:

$$P=CV^2f$$

where C is capacitance, V is the power supply voltage, and f is the total toggle rate. The total dynamic power consumption is the sum of the levels of dynamic power consumption of all the combinational logic circuits. The computed total power consumption can be output to a circuit designer for evaluation. If the computed total power consumption is less than a desired threshold, the designer can proceed to place and route the circuit design and generate data for implementing a physical circuit, such as configuration data for FPGA circuitry. Otherwise, the designer can reduce the clock speed or modify the circuit design in order to reduce the total power consumption and repeat the evaluation process.

Figure 2:
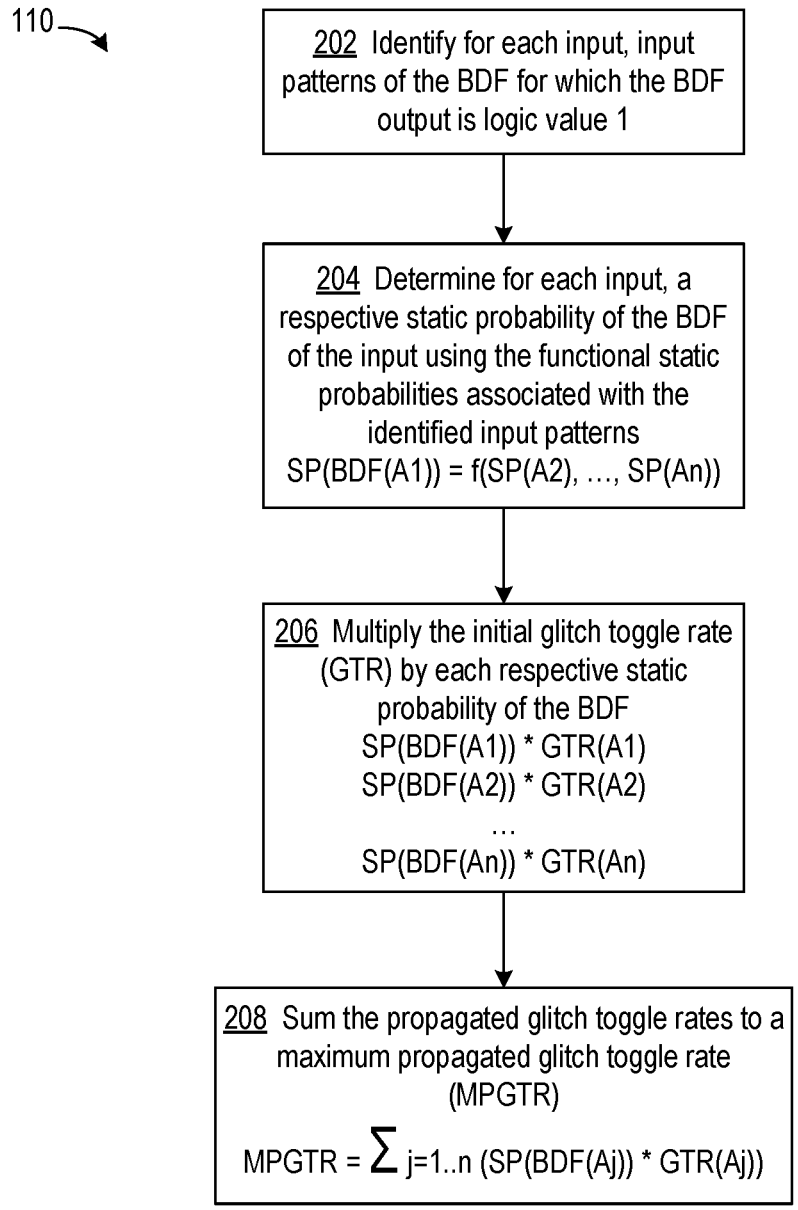
FIG. 2 shows a flowchart of a process for determining the maximum propagated glitch toggle rate of a combinational logic circuit.

FIG. 2 shows a flowchart of a process of block 110 in FIG. 1 for determining the maximum propagated glitch toggle rate of a combinational logic circuit. At block 202, the process identifies for each input to the combinational logic circuit, the input patterns of the BDF for which the BDF output value is logic 1. For example, for a 3-input AND gate (or a LUT that implements a 3-input AND function) having inputs A1, A2, and A3:

$$BDF(A1)=A2\&A3$$

$$BDF(A2)=A1\&A3$$

$$BDF(A3)=A1\&A2$$

The logic pattern of the inputs A2 and A3 of BDF(A1) for which BDF(A1) is logic value 1 for A2 and logic value 1 for A3 ("11 b"). Similarly, the logic pattern of the inputs A1 and A3 of BDF(A2) for which BDF(A2) logic value 1, is 11b, and the logic pattern of the inputs A1 and A2 of BDF(A3) for which BDF(A3) is logic value 1, is 11b.

At block 204, the process determines for each input a respective static probability of the BDF using the functional static probabilities of the inputs in the patterns identified at block 202. The static probability of the BDF(A1) is:

$$SP(BDF(A1))=f(SP(A2), \ldots ,SP(An))$$

where A2, . . . , An are the inputs of the identified pattern(s) for which BDF(A1)=logic 1. Recall that each functional static probability indicates a probability of the state of the input being logic 1 at any given time. Continuing with the example of the 3-input AND gate, A2 and A3 are the inputs in the BDF(A1) for which the output of BDF(A1)=logic 1. Note that for some more complex logic functions, not all of the inputs are necessarily factors in the BDF of an input for which the BDF is logic 1. The SP(BDF(A1)) for the 3-input AND gate is f (SP(A2), SP(A3))=SP(A2)*SP(A3), assuming the signals on A2 and A3 are independent. For more complex logic, an input can have more than one pattern (minterm) for which the BDF=1. The computation of SP(BDF(A)) with multiple minterms will be just an extension of computing for one minterm. In summary, SP(BDF(A)) is a function of SP(x)'s, where x is any input other than A to the BDF logic. For general applicability, the static probabilities of the inputs of a minterm are multiplied, and if there are multiple minterms, the products are summed.

At block 206, the process determines for each input, the maximum glitch toggle rate at the output due to glitch on that input. The maximum glitch toggle rate relative to one input can be computed as the product of the initial glitch toggle rate with respect to that input and the static probabilities of the BDFs of the input (e.g., SP(BDF(A1))*GTR(A1)). At block 208, the sum of the individual input maximum glitch toggle rates is the maximum propagated glitch toggle rate (MPGTR) of the combinational circuit.

Figure 3:
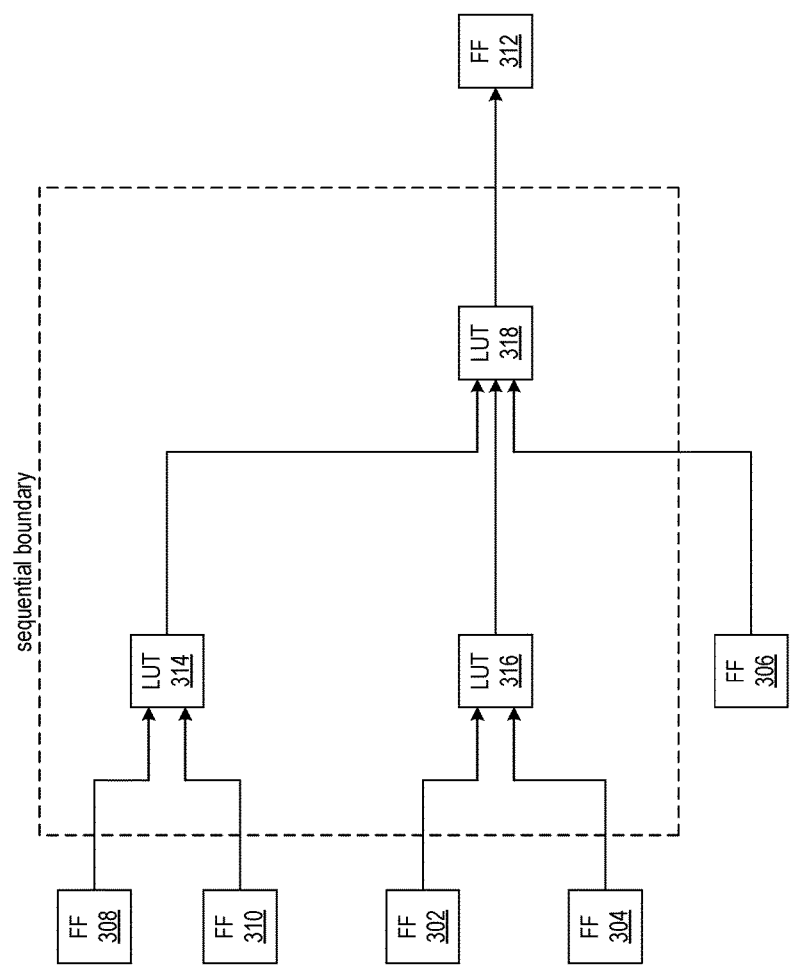
FIG. 3 shows a schematic of an exemplary logic circuit to which the disclosed approaches may be applied to determine an estimated glitch toggle rate and power consumption.

FIG. 3 shows a schematic of an exemplary logic circuit to which the disclosed approaches may be applied to determine an estimated glitch toggle rate and power consumption. Sequential circuits 302, 304, 306, 308, and 310, which may be flip-flops, for example, provide the input signals to the combinational logic circuit, and the output signal from the combinational logic circuit is input to sequential circuit 312. Thus, signal lines form the sequential circuits 302, 304, 306, 308, and 310, and to 312 form the sequential boundary of the combinational logic circuit. The combinational logic circuit includes LUTs 314, 316, and 318.

The processing shown in FIGS. 1 and 2 can be illustrated with reference to the exemplary combinational logic circuit. The toggle rates obtained at block 102 indicate for each of LUTs 314 and 316, how often the output of the LUTs change relative to a clock input. The functional static probability indicates of a probability of the state of the input being logic 1 at any given time. For example, LUT 314 has two inputs and would have a functional static probability for each input. In an exemplary implementation, the functional static probability for each input is 0.5. The functional toggle rate of LUT 314, which is determined at block 104, is based on the initial toggle rate and static probabilities of the inputs to LUT 314.

The initial glitch toggle rates referenced in block 106 are generated for each of the LUTs 314, 316, and 318. The initial glitch toggle rate is the rate at which an output signal changes state as a result of different arrival times of the input signals and can be generated based on signal path delays and gate delays.

Maximum propagated glitch toggle rates of the LUTs 314, 316, and 318 are generated as described above. As the glitch toggle rates of LUTs 314 and 316 can affect the glitch toggle rate of LUT 318, the maximum propagated glitch toggle rates determined for LUTs 314 and 316 are propagated (as shown by block 116) and used to determine the initial glitch toggle rate of LUT 318.

Figure 4:
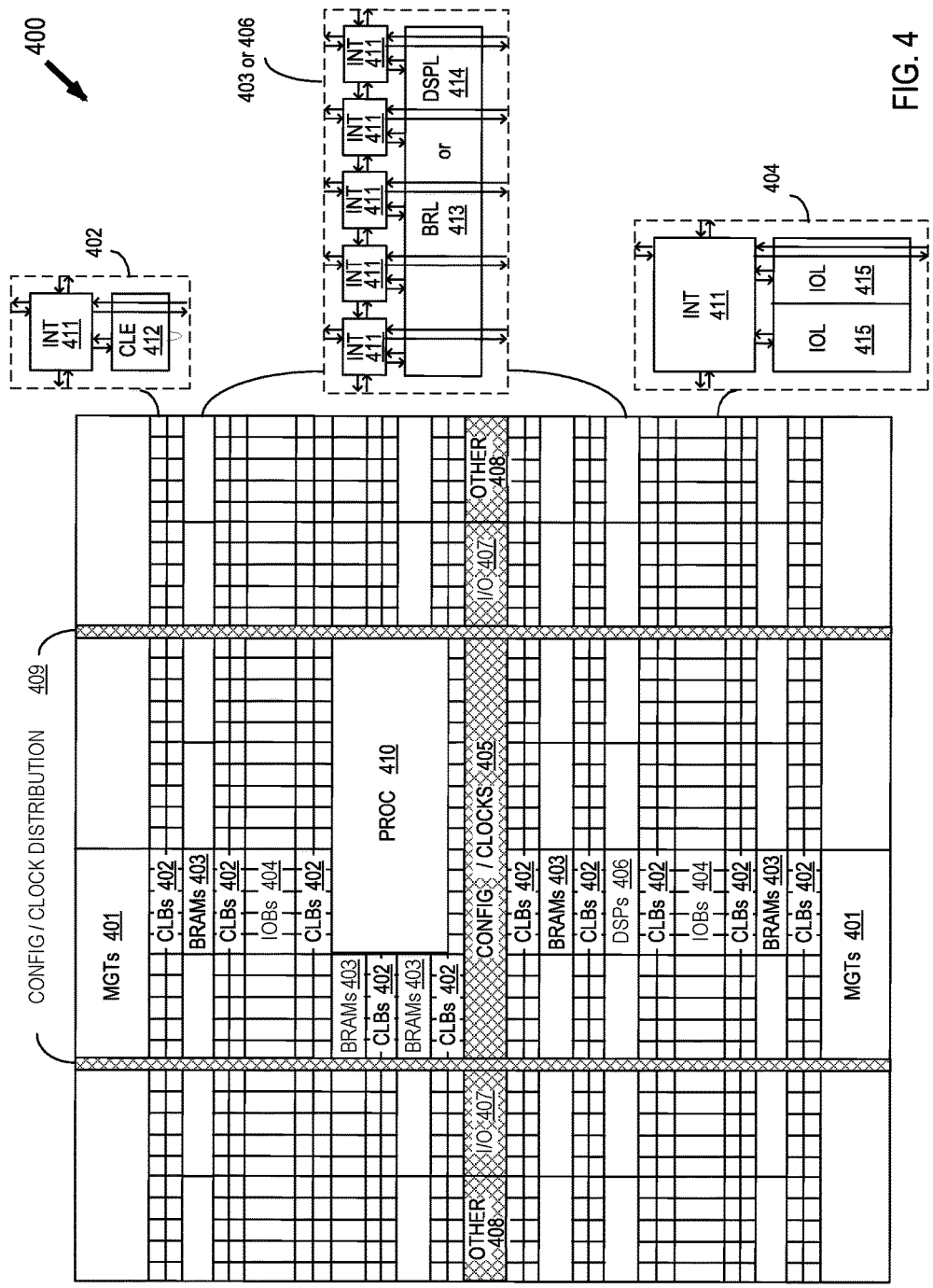
FIG. 4 shows a programmable integrated circuit on which combinational logic circuits analyzed for glitch toggle rates may be implemented.

FIG. 4 shows a programmable integrated circuit (IC) 400 on which combinational logic circuits analyzed for glitch toggle rates may be implemented. The programmable IC may also be referred to as a System On Chip (SOC) that includes field programmable gate array logic (FPGA) along with other programmable resources. FPGA logic may include several different types of programmable logic blocks in the array. For example, FIG. 4 illustrates programmable IC 400 that includes a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407, for example, clock ports, and other programmable logic 408 such as digital clock managers, analog-to-digital converters, system monitoring logic, and so forth. Some programmable IC having FPGA logic also include dedicated processor blocks (PROC) 410 and internal and external reconfiguration ports (not shown).

In some FPGA logic, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA logic. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic, plus a single programmable interconnect element INT 411. A BRAM 403 can include a BRAM logic element (BRL) 413 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL) 414 in addition to an appropriate number of programmable interconnect elements. An IOB 404 can include, for example, two instances of an input/output logic element (IOL) 415 in addition to one instance of the programmable interconnect element INT 411. As will be clear to those of skill in the art, the actual I/O bond pads connected, for example, to the I/O logic element 415, are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 4 include additional logic blocks that disrupt the regular columnar structure making up a large part of the programmable IC. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual programmable IC, more than one adjacent column of CLBs is typically included wherever the CLBs appear, to facilitate the efficient implementation of user logic.

Figure 5:
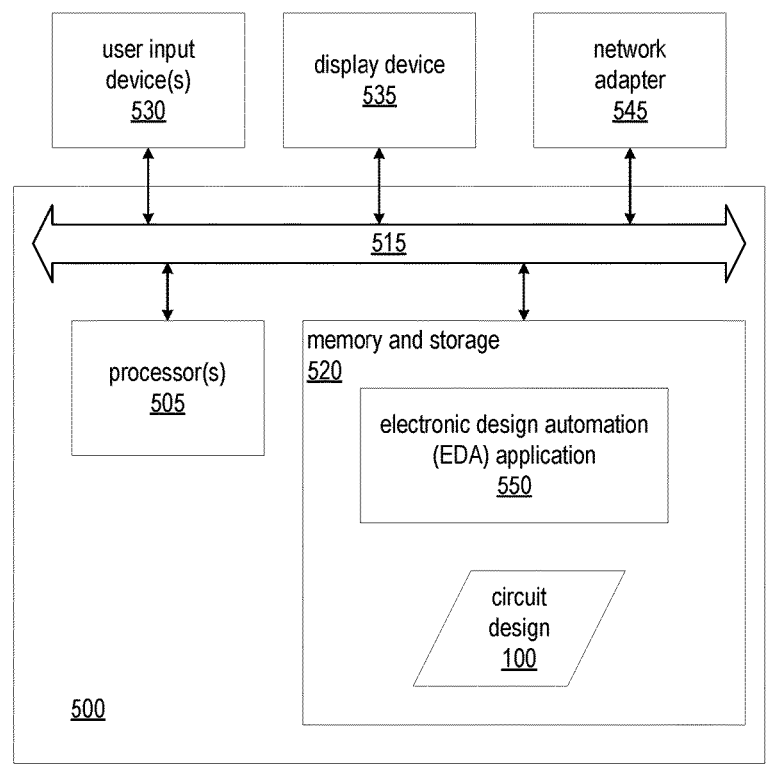
FIG. 5 is a block diagram illustrating an exemplary data processing system that can be specifically programmed with an EDA system for determining estimated glitch toggle rates and estimating power consumption.

FIG. 5 is a block diagram illustrating an exemplary computing arrangement (system) 500 that can be specifically programmed with an EDA system 550 for determining estimated glitch toggle rates and estimating power consumption. As pictured, system 500 includes at least one processor circuit (or "processor"), e.g., a central processing unit (CPU) 505 coupled to memory and storage arrangement 520 through a system bus 515 or other suitable circuitry. System 500 stores program code and circuit design 100 within memory and storage arrangement 520. Processor 505 executes the program code accessed from the memory and storage arrangement 520 via system bus 515. In one aspect, system 500 is implemented as a computer or other data processing system that is suitable for storing and/or executing program code. It should be appreciated, however, that system 500 can be implemented in the form of any system including a processor and memory that is capable of performing the functions described within this disclosure.

Memory and storage arrangement 520 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 500 may also include one or more cache memories (not shown) that provide temporary storage of at least some program code and data in order to reduce the number of times program code and data must be retrieved from local memory and persistent storage during execution.

Input/output (I/O) devices such as user input device(s) 530 and a display device 535 may be optionally coupled to system 500. The I/O devices may be coupled to system 500 either directly or through intervening I/O controllers. A network adapter 545 also can be coupled to system 500 in order to couple system 500 to other systems, computer systems, remote printers, and/or remote storage devices through intervening private or public networks. Modems, cable modems, Ethernet cards, and wireless transceivers are examples of different types of network adapter 545 that can be used with system 500.

Memory and storage arrangement 520 may store an EDA application 550. EDA application 550, being implemented in the form of executable program code, is executed by processor(s) 505. As such, EDA application 550 is considered part of system 500. System 500, while executing EDA application 550, receives and operates on circuit design 100. In one aspect, system 500 performs a design flow on circuit design 100, and the design flow may include synthesis, mapping, placement, routing, and power and glitch toggle rate estimation techniques as described herein. System 500 generates an optimized, or modified, version of circuit design 100 as circuit design 560.

EDA application 550, circuit design 100, circuit design 560, and any data items used, generated, and/or operated upon by EDA application 550 are functional data structures that impart functionality when employed as part of system 500 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for estimating power consumption. Other aspects and features will be apparent to those skilled in the art from consideration of the specification. It is intended that the specification and drawings be considered as examples only, with a true scope of the invention being indicated by the following claims.

What is claimed is:

1. A method of determining an estimated glitch toggle rate at an output of a logic circuit having a plurality of inputs, comprising: performing operations on a computing arrangement, the operations including:
   inputting functional static probabilities of the plurality of inputs, each functional static probability indicative of a probability of a state of an input of the plurality of inputs being logic 1;
   inputting a generated glitch toggle rate of the logic circuit;
   generating for each input of the plurality of inputs to the logic circuit, a Boolean Difference Function (BDF) of the input;
   determining the estimated glitch toggle rate to be a maximum glitch rate based on the generated glitch toggle rate and ones of the functional static probabilities associated with selected combinations of states of the BDF; and
   outputting data indicative of the estimated glitch toggle rate.

2. The method of claim 1, wherein the determining the estimated glitch toggle rate includes identifying for each input of the plurality of inputs, combinations of states of inputs to the BDF for which output of the BDF is equal to logic 1.

3. The method of claim 2, wherein the determining the estimated glitch toggle rate includes determining for each input of the plurality of inputs, a respective static probability of the BDF of the input using the functional static probabilities associated with inputs in the combinations of states of the inputs of the BDF for which the BDF of the input is equal to logic 1.

4. The method of claim 3, wherein the determining the estimated glitch toggle rate includes determining respective propagated glitch toggle rates of the plurality of inputs as products of the generated glitch toggle rate and the respective static probabilities of the BDFs of the plurality of inputs.

5. The method of claim 4, wherein the determining the estimated glitch toggle rate includes determining the estimated glitch toggle rate as a sum of the respective propagated glitch toggle rates.

6. The method of claim 1, wherein:
   the operations performed by the computing arrangement include reducing the estimated glitch toggle rate by a factor that is a function of one or more of a number of gate levels, differences in arrival times of inputs, or gate delays;
   the determining the estimated glitch toggle rate includes identifying for each input of the plurality of inputs, combinations of states of inputs to the BDF for which output of the BDF is equal to logic 1;
   the determining the estimated glitch toggle rate includes determining for each input of the plurality of inputs, a respective static probability of the BDF of the input using the functional static probabilities associated with inputs in the combinations of states of the inputs of the BDF for which the BDF of the input is equal to logic 1;
   the determining the estimated glitch toggle rate includes determining respective propagated glitch toggle rates of the plurality of inputs as products of the generated glitch toggle rate and the respective static probabilities of the BDFs of the plurality of inputs; and
   the determining the estimated glitch toggle rate includes determining the estimated glitch toggle rate as a sum of the respective propagated glitch toggle rates.

7. The method of claim 1, further comprising:
   placing and routing the circuit design;
   generating configuration data for implanting a circuit; and
   implementing a circuit based on the configuration data.

8. A method of estimating from a circuit design, a level of power consumption of a logic circuit implemented from the circuit design, comprising:
   performing operations on a computing arrangement, the operations including:
      determining for the logic circuit having a plurality of inputs, an estimated glitch toggle rate at an output of the logic circuit, the determining the estimated glitch toggle rate including:
         inputting functional static probabilities of the plurality of inputs, each functional static probability indicative of a probability of a state of an input of the plurality of inputs being logic 1;
         inputting a generated glitch toggle rate of the logic circuit;
         generating for each input of the plurality of inputs to the logic circuit, a Boolean Difference Function of the input; and
         determining the estimated glitch toggle rate to be a maximum glitch rate based on the generated glitch toggle rate and ones of the functional static probabilities associated with selected combinations of states of the BDF;
      determining for the logic circuit, a total toggle rate based on the estimated glitch toggle rate, generated glitch toggle rate, and a functional toggle rate of the logic circuit;
      determining the level of power consumption based on a power supply voltage level to the logic circuit, a net capacitance of the logic circuit, and the total toggle rate; and
      outputting data indicative of the level of power consumption.

9. The method of claim 8, wherein the determining the estimated glitch toggle rate includes identifying for each input, combinations of states of inputs to the BDF for which output of the BDF is equal to logic 1.

10. The method of claim 9, wherein the determining the estimated glitch toggle rate includes determining for each input of the plurality of inputs, a respective static probability of the BDF of the input using the functional static probabilities associated with inputs in the combinations of states of the inputs of the BDF for which the BDF of the input is equal to logic 1.

11. The method of claim 10, wherein the determining the estimated glitch toggle rate includes determining respective propagated glitch toggle rates of the plurality of inputs as products of the generated glitch toggle rate and the respective static probabilities of the BDFs of the plurality of inputs.

12. The method of claim 11, wherein the determining the estimated glitch toggle rate includes determining the estimated glitch toggle rate as a sum of the respective propagated glitch toggle rates.

13. The method of claim 8, wherein:
   the operations performed by the computing arrangement include reducing the estimated glitch toggle rate by a factor that is a function of one or more of a number of gate levels, differences in arrival times of inputs, or gate delays;
   the determining the estimated glitch toggle rate includes identifying for each input, combinations of states of inputs to the BDF for which output of the BDF is equal to logic 1;

the determining the estimated glitch toggle rate includes determining for each input of the plurality of inputs, a respective static probability of the BDF of the input using the functional static probabilities associated with inputs in the combinations of states of the inputs of the BDF for which the BDF of the input is equal to logic 1;

the determining the estimated glitch toggle rate includes determining respective propagated glitch toggle rates of the plurality of inputs as products of the generated glitch toggle rate and the respective static probabilities of the BDFs of the plurality of inputs; and the determining the estimated glitch toggle rate includes determining the estimated glitch toggle rate as a sum of the respective propagated glitch toggle rates.

14. The method of claim 8, further comprising:
placing and routing the circuit design;
generating configuration data for implanting a circuit; and
implementing a circuit based on the configuration data.

15. A system for determining an estimated glitch toggle rate at an output of a logic circuit having a plurality of inputs, comprising:
a processor arrangement;
a memory coupled to the processor arrangement, wherein the memory is configured with instructions that when executed by the processor arrangement cause the processor arrangement to perform operations including:
inputting functional static probabilities of the plurality of inputs, each functional static probability indicative of a state of an input of the plurality of inputs being logic 1;
inputting a generated glitch toggle rate of the logic circuit;
generating for each input of the plurality of inputs to the logic circuit, a Boolean Difference Function (BDF) of the input;
determining the estimated glitch toggle rate to be a maximum glitch rate based on the generated glitch toggle rate and ones of the functional static probabilities associated with selected combinations of states of the BDF; and
outputting data indicative of the estimated glitch toggle rate.

16. The system of claim 15, wherein the instructions for determining the estimated glitch toggle rate include instructions for identifying for each input, combinations of states of inputs to the BDF for which output of the BDF is equal to logic 1.

17. The system of claim 16, wherein the instructions for determining the estimated glitch toggle rate include instructions for determining for each input of the plurality of inputs, a respective static probability of the BDF of the input using the functional static probabilities associated with inputs in the combinations of states of the inputs of the BDF for which the BDF of the input is equal to logic 1.

18. The system of claim 17, wherein:
the instructions for determining the estimated glitch toggle rate include instructions for determining respective propagated glitch toggle rates of the plurality of inputs as products of the generated glitch toggle rate and the respective static probabilities of the BDFs of the plurality of inputs; and the instructions for determining the estimated glitch toggle rate include instructions for determining the estimated glitch toggle rate as a sum of the respective propagated glitch toggle rates.

19. The system of claim 15, wherein the memory is configured with further instructions that when executed by the processor arrangement case the processor arrangement to reduce the estimated glitch toggle rate by a factor that is a function of one or more of a number of gate levels, differences in arrival times of inputs, or gate delays.

20. The system of claim 15, wherein the memory is further configured with instructions that when executed cause the processor arrangement to:
placing and routing the circuit design;
generate configuration data for implanting a circuit; and
implement a circuit based on the configuration data.

* * * * *